2,733,218

METHOD FOR REMOVING WATER FROM LIQUID ORGANIC COMPOSITIONS

Walter M. Basch, Rumson, and Herman J. Zoeller, Union, N. J., assignors to Esso Research and Engineering Company, a corporation of Delaware No Drawing. Application July 26, 1954, Serial No. 445,916

7 Claims. (Cl. 252—344)

This invention relates to a method for removing water from water-containing liquid organic compositions, and more particularly from water-containing liquid hydrocarbon compositions, by reacting the water in such compositions with urea at an elevated temperature, the reaction products being ammonia and carbon dioxide. The method of this invention finds particular application in removing traces of water from transformer oils and the like and in breaking water-oil emulsions.

Frequently it is necessary to remove water from liquid organic compositions in order to produce a product having acceptable and desirable properties. There have been numerous methods in the prior art for accomplishing this, such as settling, coalescing, air-blowing, filtration, etc. In general, these prior art methods have been effective in removing relatively large proportions of loosely-bound water from liquid organic compositions. However, these prior art methods have generally required complicated and costly equipment and, in addition, have not been particularly successful in removing water from certain liquid organic compositions. More specifically, these prior art methods have been generally ineffective in removing, for example, small traces of water from transformer oils and the like and in breaking stable water-oil emulsions.

A novel method has now been found for removing water from water-containing liquid organic compositions and more particularly from water-containing liquid hydrocarbon compositions. In accordance with the method of this invention, water is removed from a water-containing liquid organic composition by reacting the water in the composition with urea at an elevated temperature, the reaction products being ammonia and carbon dioxide, which are readily evolved from the composition. This reaction may be represented by the following equation:

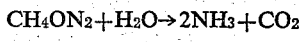

$$CH_4ON_2 + H_2O \rightarrow 2NH_3 + CO_2$$

The method of this invention may be carried out by initially heating the liquid organic composition to an elevated temperature and then admixing the urea therewith or, if desired, initially a mixture of the urea and the liquid organic composition may be formed and thereafter the mixture heated to an elevated temperature.

The elevated temperature preferably employed in this invention is in the range of about 150° to 212° F. A temperature above about 150° F. is desirable in order to provide a reasonable reaction rate. Temperatures above 212° F. may be employed if desired although they are not required.

In carrying out the preferred method of this invention the mixture of the urea and the water-containing liquid organic composition will be maintained at a temperature in the range of about 150 to 212° F. until the evolution of ammonia and carbon dioxide ceases. This will ordinarily require a period of time in the range of about 0.1 to 2 hours, the particular time being inversely related to the temperature involved.

Generally at least about one mole of urea will be added to the liquid organic composition for each mole of water contained in the liquid organic composition. However, it will be understood that if it is desired to remove only a portion of the water content of the water-containing liquid organic composition, lesser amounts of urea may be added. However, generally, it will be desired to remove essentially all of the water from the organic composition so that it is preferred in this case to use an amount of urea in excess of the stoichiometric requirement. More specifically, it is preferred to use about 1.2 to 2 moles of urea for each mole of water in the liquid organic composition to assure essentially complete removal of the water from the liquid organic composition. Any unreacted urea which is insoluble in the liquid organic composition may be removed by a simple filtration step.

The method of this invention is particularly directed to removal of water from water-containing liquid hydrocarbon compositions. More specifically, as has been stated heretofore, the method of this invention finds particular application in removing traces of water from transformer oils and the like and in breaking water-oil emulsions. However, it will be understood that the method of this invention may be utilized in removing water from other water-containing liquid hydrocarbon compositions such as gasoline, kerosene, Diesel fuels, fuel oils, lubricating oils, flushing oils, etc.

The term "liquid hydrocarbon composition" as used in this specification generally refers to those compositions which are normally liquid at atmospheric conditions of temperature and pressure, although it will be understood that elevated or reduced pressures and/or elevated temperatures may be utilized to dehydrate certain other hydrocarbons in accordance with the method of this invention which are not liquids at atmospheric conditions but which are liquids at the aforementioned conditions of temperature and pressure.

One specific aspect of this invention concerns the dehydration of transformer oils and the like. The water content of transformer oils and other oils which are utilized in electrical applications is a critical specification which must be met in producing acceptable commercial oils. Transformer oils, for example, are normally produced by chemical treating of a petroleum distillate with an acid such as sulfuric acid, followed by caustic neutralization and water washing. A settling period is employed to partially dehydrate the transformer oil product and considerable time is generally involved in this operation. A final filtration step is frequently necessary to remove traces of water in order to produce an oil of acceptable dielectric strength. Because a dielectric strength of at least about 30 kilovolts is generally considered acceptable, it is frequently necessary to repeat the filtration step in order to assure meeting this particular specification. Since this filtration step is usually carried out in a plate and frame press employing paper blotter filter elements, considerable labor and time are spent in producing specification transformer oil.

On the other hand, the method of this invention is simple, convenient and extremely effective in removing these traces of water from transformer oils and the like. The method involves simply the addition of urea to the water-containing transformer oil followed by a short period of heating at an elevated temperature. Whereas in the prior art methods difficulty is encountered in meeting the specification for water content, the method of the present invention is able to produce a transformer oil of substantially better quality than that required by the usual oil specifications.

Another specific aspect of this invention concerns the breaking of water-oil emulsions. Frequently in the petroleum industry stable water-oil emulsions are formed such as water emulsions of crude oils, gas oils, etc. The methods of the prior art have been generally ineffective in breaking stable emulsions of water and these petroleum oils. It has been found, however, that the method of this invention is particularly effective in removing water from such emulsions.

The following are examples of the method of this invention for removing water from several different liquid petroleum compositions.

EXAMPLE 1

A white oil sold under the trade name of "Marcol J" which had an SSU viscosity of about 90 at 100° F. and which had been manufactured by treating a mineral oil distillate with sulfuric acid followed by caustic neutralization and subsequent water washing, was saturated with water and allowed to settle. One portion of this transformer oil was dehydrated by a method known to the prior art, which consisted of filtering the transformer oil through a plate and frame press containing paper blotter filter elements. The second portion of this transformer oil was mixed with about a 50% excess of urea (based on the stoichiometric requirement for the water in the oil), heated to about 210° F. for about one-half hour and also filtered through a plate and frame press containing paper blotter filter elements. Dielectric constant determinations were made on both the non-urea treated and the urea treated products. The results are shown below:

Table I

Dielectric strength (kilovolts)
Non-urea treated (conventional method)_____ 26.6
Urea treated (method of this invention)_____ 43.8

Since a dielectric strength of at least 30 kilovolts is necessary to pass the commercially accepted specification, it will be noted that the non-urea treated transformer oil would require additional treatment in order to meet this specification and it will also be noted that the transformer oil treated in accordance with this invention produced a superior transformer oil having a dielectric strength substantially in excess of that required for specification transformer oil.

EXAMPLE 2

Two stable crude oil emulsions, emulsion I containing salt water and emulsion II containing water and caustic, were treated with urea in accordance with this invention. The crude oil in emulsion I was a low gravity, heavy fuel type Canadian crude oil having an API gravity of about 13° to 14°. The crude oil in emulsion II was a high asphalt content type Venezuelan crude oil having an API gravity of about 9° to 10°. These two crude oil emulsions were separately treated with 30 wt. percent urea (based on total emulsion) at about 160° to 170° F. for 0.5 hour with agitation and were then settled for 16 hours at 140° to 150° F., after which the settled water was drawn off. There was no evidence of any insoluble unreacted urea in either of the two treated emulsions. Inspections of the treated and untreated materials (as determined by distillation) are shown below:

Table II

| | Volume Percent Water | |
| --- | --- | --- |
| | Before Urea Treatment | After Urea Treatment |
| Emulsion I | 34.0 | 25.0 |
| Emulsion II | 34.5 | 19.5 |

It will be noted that the results shown in Table II indicate that a substantial proportion of the water was removed even though less than one mole of urea was employed per mole of water contained in the water-oil emulsion.

What is claimed is:

1. A method for removing water from a water-containing liquid organic composition which comprises contacting the water in said composition with urea at an elevated temperature in the range of about 150° to 212° F. to thereby effect a reaction between the urea and the water, at least about one mole of urea being employed per mole of water originally contained in said liquid organic composition.

2. Method according to claim 1 wherein said composition consists essentially of water-containing hydrocarbons.

3. Method according to claim 2 wherein any unreacted and insoluble urea is removed from said composition by filtration.

4. A method for removing water from a water-containing liquid hydrocarbon composition which comprises mixing said composition with at least about one mole of urea for each mole of water contained therein and heating the resultant mixture to a temperature in the range of about 150° to 212° F. until evolution of ammonia and carbon dioxide ceases.

5. A method for removing water from a water-containing liquid hydrocarbon composition which comprises initially heating said composition to a temperature in the range of about 150° to 212° F. and then admixing with the heated composition at least about one mole of urea for each mole of water contained therein.

6. A method for removing traces of water from transformer oils and the like which comprises mixing a water-containing oil with at least about one mole of urea for each mole of water contained therein and heating the resultant mixture to a temperature in the range of about 150° to 212° F. for about 0.1 to 2 hours.

7. A method for breaking water-oil emulsions which comprises admixing a water-oil emulsion with at least about one mole of urea for each mole of water contained therein at a temperature in the range of about 150° to 212° F. for about 0.1 to 2 hours.

References Cited in the file of this patent
UNITED STATES PATENTS

| | | |
| --- | --- | --- |
| 2,427,326 | Goodloe et al. | Sept. 9, 1947 |
| 2,568,740 | Kirkpatrick et al. | Sept. 25, 1951 |
| 2,568,742 | Kirkpatrick | Sept. 25, 1951 |
| 2,568,745 | Kirkpatrick | Sept. 25, 1951 |
| 2,666,020 | Arnold et al. | Jan. 12, 1954 |
| 2,676,167 | Findlay et al. | Apr. 20, 1954 |